US008873446B2

(12) United States Patent
Ahn et al.

(10) Patent No.: US 8,873,446 B2
(45) Date of Patent: Oct. 28, 2014

(54) METHOD AND APPARATUS FOR SUPPORTING MULTICAST OF AV DATA IN A NETWORK

(75) Inventors: Sung Joon Ahn, Kyunggi-do (KR); Ku Bong Min, Seoul (KR)

(73) Assignee: LG Electronics Inc., Seoul (KR)

( * ) Notice: Subject to any disclaimer, the term of this patent is extended or adjusted under 35 U.S.C. 154(b) by 2176 days.

(21) Appl. No.: 11/578,314

(22) PCT Filed: Apr. 8, 2005

(86) PCT No.: PCT/KR2005/001022
§ 371 (c)(1),
(2), (4) Date: Jul. 23, 2007

(87) PCT Pub. No.: WO2005/099175
PCT Pub. Date: Oct. 20, 2005

(65) Prior Publication Data
US 2007/0280145 A1    Dec. 6, 2007

(30) Foreign Application Priority Data
Apr. 12, 2004   (KR) .......................... 10-2004-0025122

(51) Int. Cl.
*H04H 20/71*   (2008.01)
*G06F 15/16*   (2006.01)
*H04L 12/18*   (2006.01)

(52) U.S. Cl.
CPC ..................................... *H04L 12/18* (2013.01)
USPC ........... 370/312; 709/217; 709/218; 709/219; 709/231

(58) Field of Classification Search
CPC ... H04L 12/18; H04L 63/10; H04L 29/12254; H04L 29/12264; H04L 29/12283; H04L 29/12292; H04L 61/2061; H04L 61/2069
USPC .................................... 370/312; 709/217–219
See application file for complete search history.

(56) References Cited

U.S. PATENT DOCUMENTS

| 6,018,771 | A  | * | 1/2000  | Hayden .......................... 709/231 |
| 6,498,897 | B1 |   | 12/2002 | Nelson et al. |
| 6,751,221 | B1 | * | 6/2004  | Saito et al. ..................... 370/392 |
| 7,143,132 | B2 | * | 11/2006 | Klein et al. .................... 709/203 |
| 7,657,644 | B1 | * | 2/2010  | Zheng ............................ 709/231 |
| 2001/0042107 | A1 |   | 11/2001 | Palm |
| 2004/0260839 | A1 | * | 12/2004 | Onoda et al. .................. 709/247 |
| 2005/0010638 | A1 | * | 1/2005  | Richardson et al. .......... 709/204 |
| 2006/0174276 | A1 | * | 8/2006  | Derrenberger et al. ......... 725/46 |
| 2006/0218575 | A1 | * | 9/2006  | Blair ............................... 725/28 |

FOREIGN PATENT DOCUMENTS

EP    0888029    12/1998

* cited by examiner

*Primary Examiner* — Matthew Sams
(74) *Attorney, Agent, or Firm* — Lee, Hong, Degerman, Kang & Waimey

(57) ABSTRACT

The present invention relates to a multicast supporting method for AV data in a network such as UPnP AV network. In the present invention, it is checked based on protocol information of an object containing media data whether multicasting of the object is supported and, if supported, a multicast address is assigned to the object to which an IP address has not been allocated.

14 Claims, 4 Drawing Sheets

METHOD AND APPARATUS FOR SUPPORTING MULTICAST OF AV DATA IN A NETWORK

CROSS-REFERENCE TO RELATED APPLICATIONS

This application is the National Stage filing under 35 U.S.C. 371 of International Application No. PCT/KR2005/001022, filed on Apr. 8, 2005, which claims the benefit of earlier filing date and right of priority to Korean Patent Application No. 10-2004-0025122, filed on Apr. 12, 2004.

1. TECHNICAL FIELD

The present invention relates generally to AV networking technology, and more specifically, to a method and apparatus for supporting multicast of AV data in a UPnP network.

2. BACKGROUND ART

Networking technologies based on various small-sized devices have been recently emerged and commercialized.

A home network enables to interconnect various consumer electronics devices such as refrigerator, TV set, washing machine, PC, and stereo, making it possible to providing a convenient, user-friendly living environment.

The UPnP™ (hereinafter, referred to UPnP) standard has been proposed to offer such a digital home network platform.

PnP (Plug and Play) technology that is widely embodied in most PC operating systems simplifies the process of adding hardware. UPnP technology is designed to extend the PnP technology to the network domain that has platforms consisting of Internet standard technologies such as TCP/IP, HTTP and XML. Thanks to UPnP technology, various consumer electronics devices with network functions, network printer, and Internet Gate are interconnected to each other to provide a unified network in which a new network device can be added readily and accessed from other devices remotely.

A UPnP network usually comprises a plurality of UPnP-_devices, services and a control point (CP). Each service, the smallest accessible, controllable unit in a UPnP network is designated by its own unique state variables.

The CP is a control application that runs on a device on the network, such as PDA and has programmatic access to, monitors, and controls all of the devices on the network and/or their services.

The CP discovers devices on the network, invokes actions on services on the devices, subscribes to event notifications, and controls the device upon user's request that is made through user interface (UI).

As shown in FIG. 1, a UPnP AV home network comprises a media server 120 that provides AV data to devices on the network; a media renderer 130 that performs playback of the AV data; and a CP 110 that controls the media server 120 and the media renderer 130.

Playback of the media data on the network of FIG. 1 is described below in detail.

The media server 120 gets information about media data files, for example, directory path information through its own file system and sends to the CP 110 in response to UPnP action such as browsing action. Once a media file stored in the media server 120 is chosen via the UI on the CP 110, a stream of the media data file is sent to and presented at the media renderer 130.

Existing streaming types can be adopted as the format of the media data stream. The streaming type is not specified in the UPnP AV standard yet, and the out-of-band transfer protocol is currently adopted as the streaming protocol. For example, in case where a media stream is transmitted in the real-time transfer protocol (RTP), the transmission of the media stream can be monitored and transmission parameters can be adjusted by using the real-time control protocol (RTCP).

The UPnP AV networking mechanism is described below in more detail.

The AV control point 110 controls devices on the network such as media server 120 and media renderer 130 by invoking UPnP action on the devices. The simple object access protocol (SOAP) encapsulates a UPnP action request or response. In addition, the AV control point 110 receives all state variable changes by subscribing to the notification service on devices on the network.

The media server 120 offers ContentDirectory service 121 for searching for media contents stored in itself, ConnectionManager service 122 for managing connections established with other devices such as the media renderer 130, and AV Transport service 123 for controlling playback of media content such as play and stop.

The media renderer 130 offers RenderingControl service 131 for adjusting conditions of the media content presentation such as brightness and contrast, ConnectionManager service 132, and AV Transport service 133.

The AV CP 110 receives information on media content files on the media server 120 by invoking the ContentDirectory service 121 on the media server. Once a particular media file is chosen based on the information, the AV CP 110 establishes a connection between the media server 120 and the media renderer 130 by invoking the ConnectionManager services 122 and 132 on the two devices. The AV CP 110 sets playback control variables by using the AV Transport service 123 or 133 and then makes the media content played back by invoking a playback action either on the media server (for push mode) or on the media renderer (for pull mode). The playback conditions such as brightness, contrast, and audio volume can be adjusted during playback by using RenderingControl service 131 on the media render 130.

If subscribed to the event notification service, the AV CP 110 is notified that media contents on the media server 120 or state information on the media stream being played back is changed.

On the other hand, a user's request may be made to play a media content on more than one media renderers. For example, it is likely that a user goes to kitchen and, if there is a media renderer there, the user wants to keep watching a media content seamlessly there that the user has watched in a living room.

The UPnP technology does not, however, support multicast of media content files so that IP addresses are assigned inefficiently in the network. Furthermore, since media content files do not include information indicative of if they can be multicast, the UPnP technology does not offer a method of handling the multicast join requests from a plurality of media renderers.

3. DISCLOSURE OF THE INVENTION

In view of the shortcomings of the related art, it is an object of the present invention to provide a method and apparatus of supporting multicast of AV data on a network, wherein protocol information indicative of if multicast of an AV object is supported is tagged on the AV object, and based on the protocol information, a multicast address is assigned dynamically and multicast join requests from devices on the network are handled and processed appropriately.

The present invention is characterized in that it is checked based on protocol information of an object containing media data whether multicasting of the object is supported and, if supported, a multicast address is assigned to the object to which an IP address has not been allocated.

In one embodiment of the present invention, the protocol information indicative of if multicast of an object is specified as one of the protocols: "rtp-udp-multicast", "internal-multicast", or "rtsp-rtp-udp-multicast".

In another embodiment of the present invention, assignment of the multicast address (including port number) is conducted by a media server that contains media content objects.

In still embodiment, assignment of the multicast address is conducted by a control point that controls a media server by invoking actions on services on the media server.

In yet another embodiment, multicast addresses are assigned to multicast-support objects among objects that are included in the result of browsing action that a control point requests to a media server.

In a further embodiment, when playback of an object to which a multicast address has been assigned is requested, the multicast address of the object is sent to all of the devices associated with the multicast stream of the object.

In a further embodiment, if an object is selected for playback, URI information of the object is sent to a media server and a playback action on the media server is invoked.

In a further embodiment, if an object is selected for playback, URI information of the object is sent to a media renderer and a playback action on the media renderer is invoked.

The present invention enables to implement an efficient multicast of objects containing AV data in an AV network by assigning multicast addresses by utilizing the information indicative of whether or not objects are multicast-support.

4. BRIEF DESCRIPTION OF THE DRAWINGS

5. BEST MODE FOR CARRYING OUT THE INVENTION

In order that the invention may be fully understood, preferred embodiments thereof will now be described with reference to the accompanying drawings.

For playback of a media content in a media server in a UPnP AV network, streaming of the media content is performed in accordance with a predetermined protocol between a media server and a media renderer.

In one embodiment of the present invention, streaming of the media content is performed in accordance with the IP multicast protocol so that the media content stream on one media server is sent to more than one media renderers simultaneously.

Figure 1:
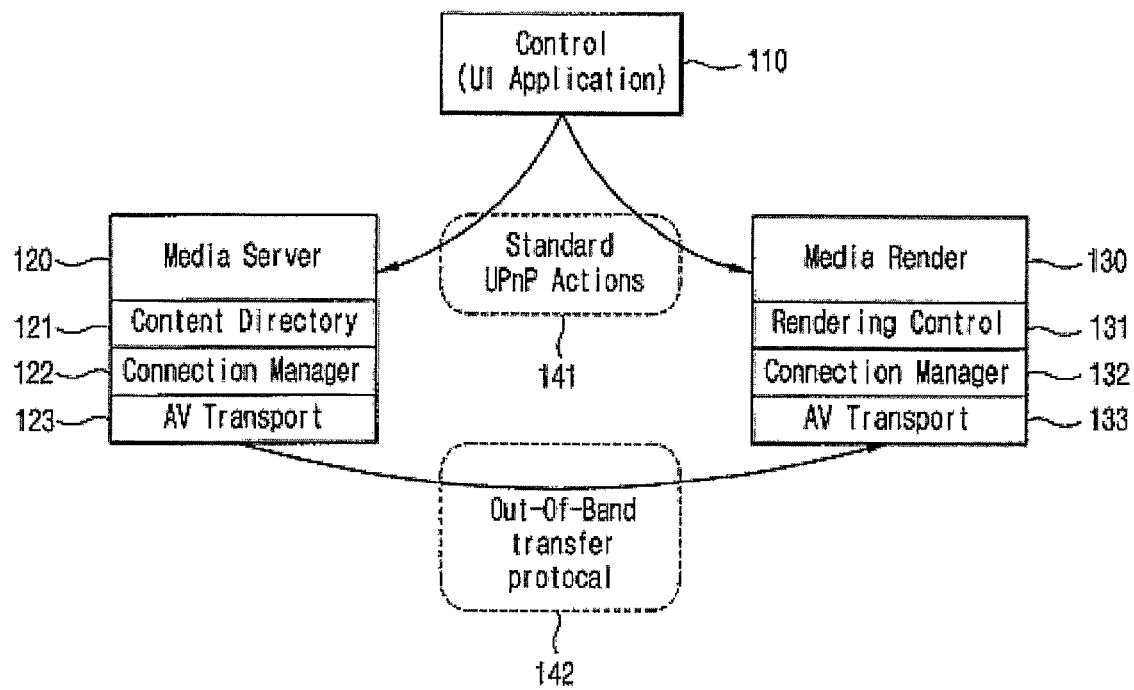
FIG. 1 illustrates configuration of a general UPnP AV network.
Figure 2:
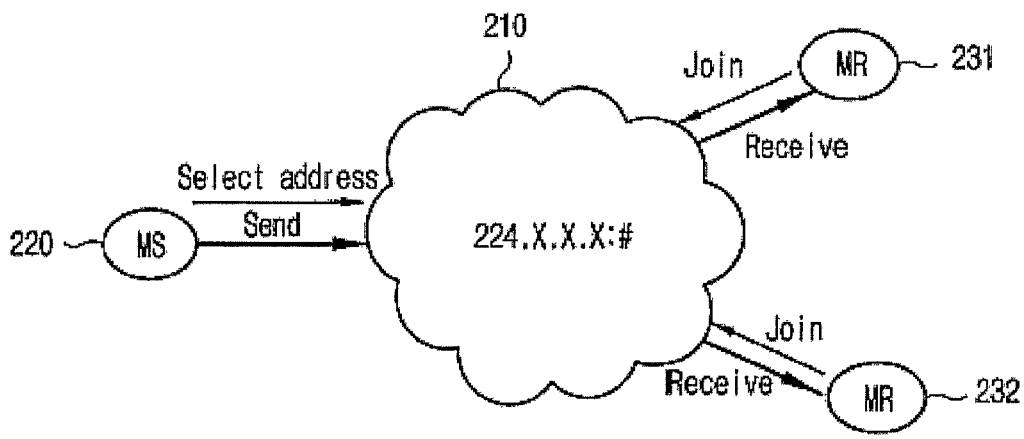
FIG. 2 illustrates IP multicast streaming.

As shown in FIG. 2, in the IP multicast protocol, the network bandwidth can be efficiently managed in such a way that a plurality of media renderers 231 and 232 are joined to a multicast group 210 that is offered by a media server 220.

In one embodiment of the present invention, a multicast group address (hereinafter referred to as multicast address) corresponding to a multicast group is chosen from a pool of available addresses that is managed by a media server or control point.

A method of assigning multicast addresses in accordance with the present invention has advantages over the conventional method of pre-assigning multicast addresses in that address resources can be utilized efficiently. For example, if most media files (objects) stored in a media server are multicast-support and thus have their own multicast addresses, utilization of the multicast addresses is very inefficient in case that the number of media objects being streamed simultaneously is relatively small. On the other hand, the present invention allows an efficient multicast of media objects with a relative small number of multicast addresses by assigning multicast addresses to only media objects that are expected to be streamed sooner or late.

Generally, the stream of media content in a UPnP AV network is delivered in push or pull mode.

In embodiments of the present invention, "rtp-udp-multicast" or "udp-multicast(internal method)" protocols are defined to indicate that the IP multicast of the push mode is supported. The protocol indication information is included in the protocol information of a multicast-support object.

In addition, "rtsp-rtp-udp-multicast" protocol that uses the RTSP protocol internally is defined to indicate that the IP multicast of the pull mode is supported, and the protocol indication information is included in the protocol information of a multicast-support object. The "rtsp-rtp-udp-multicast" implies that the streaming of a media content is the same as that of the "rtsp-rtp-udp" unicast protocol except that a new media renderer can join a group of media renderers during streaming of the media content.

In embodiments of the present invention, one of the three protocol names ("rtp-udp-multicast", "internal-multicast" and "rtsp-rtp-udp-multicast") is specified in the protocol information 'ProtocolInfo' of a media file (object) stored in a media server to support the IP multicast streaming.

If the specified protocol name includes a sub-string of "multicast", upon a user's request, a control point is able to allow a new media render to join a multicast group consisting of media renderers associated with the current streaming connection.

The multicast address assignment and the protocol specification will be described below in detail with specific examples.

Before assignment of a multicast address, the protocol information in a metadata of a multicast-support object among media files stored in a media server is given as shown in Example 1.

Example 1

"protocolInfo=rtp-udp-multicast:*:MPV:*"

After the browsing action is finished, a multicast address is assigned to the object, and the protocol information of the object is given, as shown in Example 2.

Example 2

"protocolInfo=rtp-udp-multicast:230.1.1.1:MPV: 15000"

The example 2 shows that IP address field and additional info field have been added to the protocol information of the object. The addition is executed by a device itself that assigns a multicast address, that is, a media server or control point.

In embodiments of the present invention, whether or not an object is multicast-support is determined by identifying the specified protocol name or by checking if the "multicast" string is included in the protocol name in the 'protocolInfo'. A multicast address is assigned and added to the 'protocolInfo' when the object is likely to be played, for example, after the object has been browsed.

Methods of assigning multicast addresses in accordance with the present invention are described below with reference to FIGS. 5 and 6.

Figure 5:
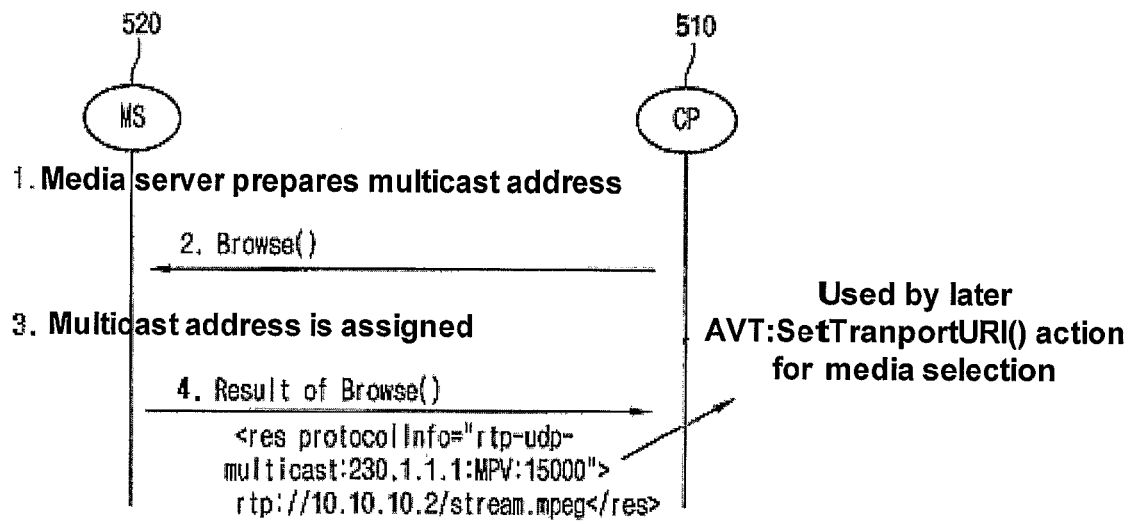
FIGS. 5 and 6 illustrate multicast address assignment for push mode and pull mode, respectively.

In an embodiment of FIG. 5, a media server 520 selects an available IP multicast address from its address pool in order to assign multicast addresses to multicast-support objects among objects being browsed. And then, the media server 520 sends the selected multicast address to a control point 510 with 'ProtocolInfo attribute' value of <res> element in the metadata of the object.

To be specific, the media server 520 prepares available pairs of addresses and ports in advance from its own multicast address pool. When a browse action is received, the media server 520 identifies multicast-support objects among objects being browsed by checking if the "multicast" identifier is included in 'ProtocolInfo' of the object, writes the prepared pairs of addresses and ports to <res> elements of the multicast-support objects, and then returns the browsing result with the updated <res> element to the control point 510.

In another embodiment of the present invention, multicast addresses may be selected from the multicast address pool at the instant that a browse action is invoked.

The following example illustrates <res> element of a multicast-support object that returns to the control point 510 according to the steps described above.

Example

<res protocolInfo="rtp-udp-multicast:230.1.1.1: MPV:15000">rtp://10.10.10.2/stream1.mpeg</res>

If it is determined that a multicast address that has been assigned to an object already is no longer valid, the media server 520 reselects a new multicast address from the multicast address pool and assigns the reselected multicast address to the object, updating the <res> element of the object. At this time, an event is generated because of change of system update id and container (object) update id, and due to the event notification, it is possible to notify the reassignment of multicast address to the object to the control point 510.

After the control point 510 receives the browsing result from the media server 520, if an object is selected among the browsed result by a user, the control point 510 establishes a connection between devices based on 'ProtocolInfo' of the object, and sends the universal resource indicator (URI) of the object to the media server (push mode of FIG. 3) or the media renderer (pull mode of FIG. 4) by referring to <res> element of the object.

Figure 6:
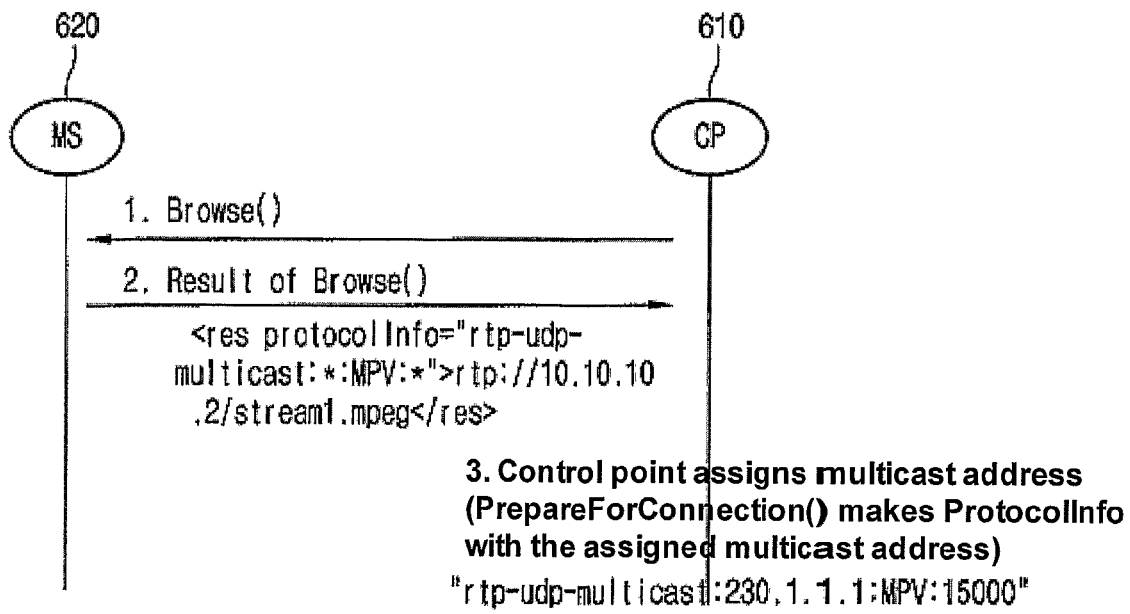

FIG. 6 illustrates a method of assigning a multicast addresses to an object in accordance with another embodiment of the present invention, where an IP multicast address is assigned by the control point 610.

The control point 610 determines if an object is multicast-support by invoking a browse action on the media server 620 and checking the protocol type in 'ProtocolInfo' of the object from the browsing result from the media server 620.

<res protocolInfo="rtp-udp-multicast:*:MPV:*">rtp://10.10.10.2/stream1.mpeg</res>

For example, the <res> element of an arbitrary object that is received from the media server 620 is as follows.

<res protocolInfo="rtp-udp-multicast:*:MPV:*">rtp://10.10.10.2/stream1.mpeg</res>

Because the IP address field and additional info field is undetermined (marked as "*"), an available address on the network is assigned by the control point 610. To be specific, since 'ProtocolInfo' of the object has the "multicast" identifier, the control point 610 selects an address from its multicast address pool and inserts the selected address and port number to the IP address field and additional info field (for the port number), respectively. The selected address may need some manipulation before it is assigned to the object.

Once playback of the object is requested by a user, the control point 610 sends the 'ProtocolInfo', which includes the assigned multicast address and port number, to the media server 620 as the input parameter of CM:PrepareForConnection action.

Figure 3:
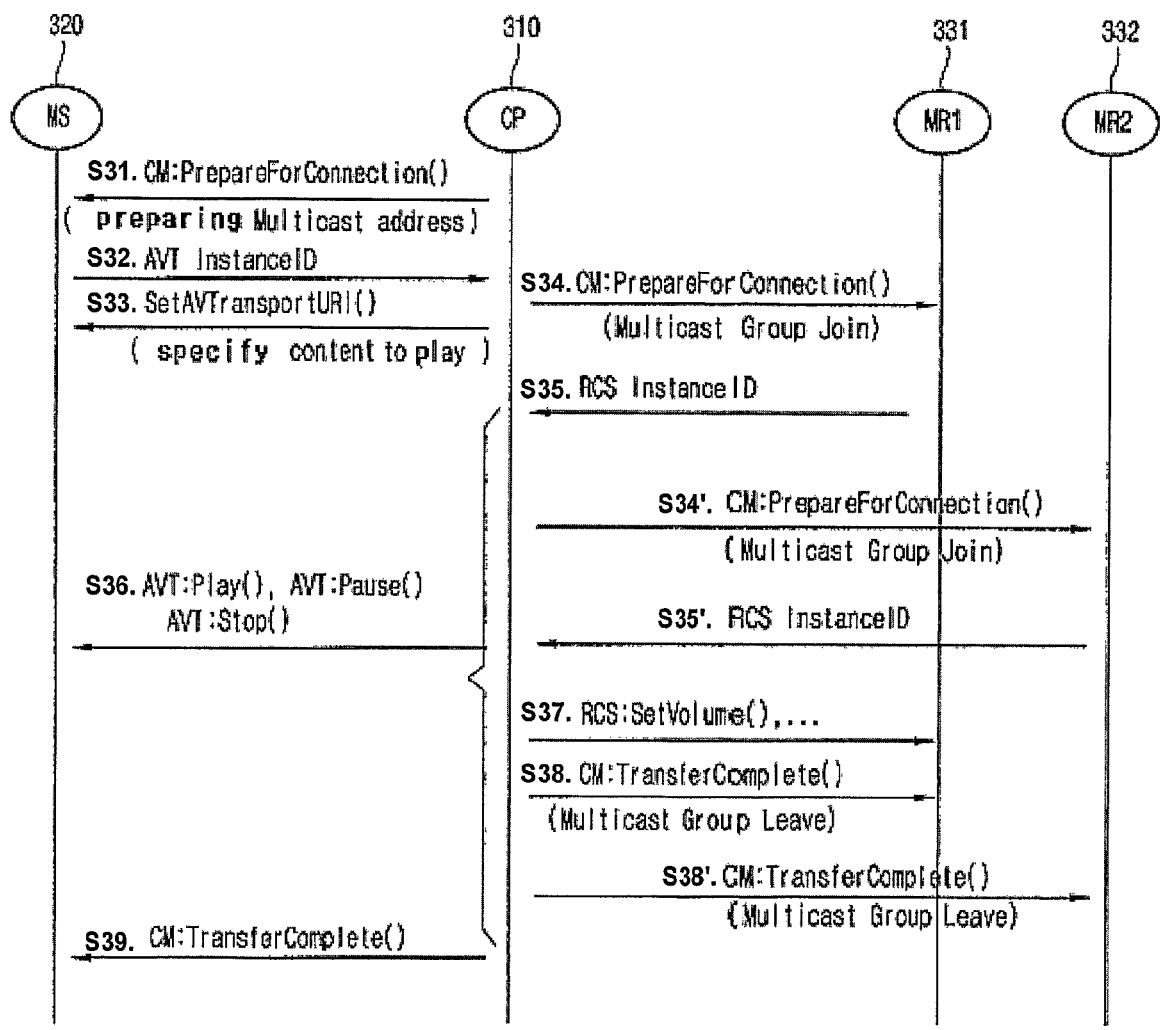
FIGS. 3 and 4 illustrate the series of steps that are executed in devices on a network when a multicast-support object is chosen by a control point for push mode and pull mode, respectively, in accordance with the present invention.
Figure 4:
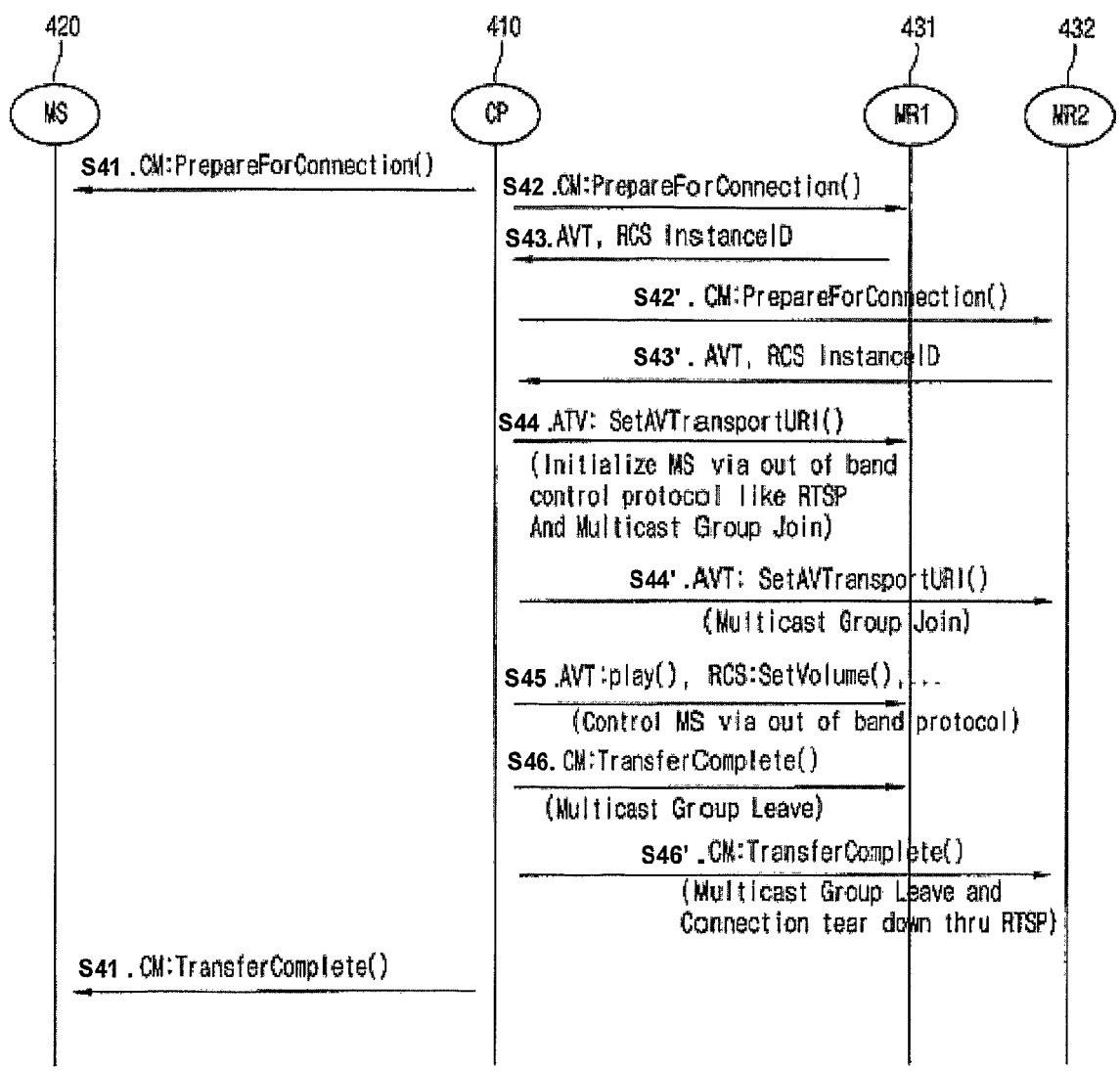

FIGS. 3 and 4 illustrates series of steps that are executed in devices on a network when a multicast-support object is chosen by a control point for push mode and pull mode, respectively, in accordance with the present invention.

To begin with description of FIG. 3, the control point 310 sends a multicast address (address and port number) to a media server 320 via the input parameter of CM:PrepareForConnection action (S31) so that the media server 320 gets ready to transmit media content immediately when a play action is invoked. By using CM:PrepareForConneciton action (S34, S34'), the control point 310 sends the multicast address to one or more media renderers 331, 332 to notify the multicast group join.

The control point 310 invokes SetAVTTransportURI() action (S33) on the media server 320 to designate the wanted media content and initialize control variables for playback of the media content.

Since then, in order to start streaming of the media content the control point 310 invokes AVT:Play() action (S36). The media content stream is sent to and presented by all media renderers joined to the same multicast group.

In this way, a user can watch a wanted media content with one or more media renderers 331 and/or 332.

During the playback of the media content, if user's request is made, the control point 310 can pause and stop the playback by sending AVT:Pause() and AVT:Stop() actions.

On the other hand, it is possible that, while the media content is being streamed, one of the media renderers 331, 332 can be joined to the multicast group associated with the media content. To be more specific, if a user requests to receive a stream of the media content at a media renderer 332 other than the media renderer 331 currently receiving the media content stream, the control point 310 determines whether the media content is multicast-support by examining 'ProtocolInfo' of the requested media content, and if supported, allows the media renderer 332 to join the multicast group related to the media content stream by invoking CM:PrepareForConnection action (S34') on the media renderer 332. In this case, the media renderer 332 begins to receive the media content stream from the point that the request is made.

If the media content is not multicast-support, the control point 310 sends an appropriate error message and ignores the user request. In the case, the control point may allow the media renderer 332 to receive the media content stream from the beginning by using the unicast protocol.

Once the playback is completed, the control point 310 expires the multicast group of the media renderers (S38, S38')

and finishes the streaming conducted by the media server 320 (S39) by invoking CM:TransferComplete( ) action.

FIG. 4 illustrates a series of steps for multicasting a media content for the pull mode, which is described below in detail.

Unlike the push mode, in the pull mode, AV Transport service on a media renderer takes control of playback of the media content. Therefore, unlike the pull mode of FIG. 3 in which actions S33 and S36 to AV Transport service are sent to the media server, the control point 410 sends actions S44 and S44' to AV Transport service on each of media renderers 431, 432 that belong to the same multicast group. Of course, the ID information required to identify each AV Transport service is sent from each of the media renders to the control point 410 (S43, S43').

By means of SetAVTransportURI( ) action on each media render 431 and/or 432 in the same multicast group, a media content to be multicast streamed is specified (S44, S44'), and the control point 410 invokes AVT:Play( ) action to play the chosen media content (S45).

Once the playback is completed, the control point 410 expires the multicast group of the media renderers 431, 432 (S46, S46') and finishes the streaming conducted by the media server 420 by sending CM:TransferComplete( ) action to the media server 420.

As in the embodiment of FIG. 3, one of the media renderers 431, 432 can request to receive the media content stream by joining to the multicast group during streaming of the media content and. For example, if playback of a media content being streamed is requested by a new media renderer, the media content stream from the point that the request is made is sent to and presented at the media renderer by means of sequential execution of steps of S42', S43', S44', and S45'.

The invention claimed is:

1. A method of performing multicast in a network, the method performed by a media server and comprising:
   receiving, at the media server, a browse action from a controller;
   transmitting a browse response to the controller in response to the browse action, wherein the browse response includes access information providing a path to a specific media file; and
   generating a multicast address for multicast of the specific media file in a case that metadata of the specific media file includes a multicast-support identifier, after the browse action is received,
   wherein the specific media file accessed by the access information is played using the generated multicast address on at least one renderer controlled by the controller,
   wherein the multicast-support identifier is included in protocol information of the metadata, and
   wherein the protocol information is comprised of the multicast-support identifier, the multicast address and a port number.

2. The method as set forth in claim 1, wherein the multicast-support identifier indicates a protocol type and is specified as "rtp-udp-multicast", "internal-multicast", or "rtsp-rtp-udp-multicast".

3. The method as set forth in claim 1, wherein generating the multicast address comprises generating a multicast address for multicast of each media file when a number of the specific media file is more than two.

4. The method as set forth in claim 1, wherein the multicast address is transmitted from the controller to at least one media renderer, and whereby the at least one media renderer renders the media file multicasted from the media server.

5. The method as set forth in claim 4, wherein upon request from another media renderer for rendering of the media file that is being multicasted by the at least one media renderer, the controller checks whether the multicast of the media file being multicasted is supported based on the metadata of the media file being multicasted, and determines whether to allow the other media renderer to join a multicast group based on the checked result.

6. The method as set forth in claim 1, further comprising receiving, at the media server, the multicast address transmitted to the controller from the controller for multicast preparation.

7. The method as set forth in claim 1, further comprising:
   updating the metadata of the specific media file by reassigning a new multicast address in a case that the multicast address is not valid.

8. A networked apparatus for performing multicast, comprising:
   an interface unit; and
   a processor configured to:
      receive, via the interface unit, a browse action from a controller;
      transmit, via the interface unit, a browse response to the controller in response to the browse action, wherein the browse response includes access information providing a path to a specific media file; and
      generate a multicast address for multicast of the specific media file in a case that metadata of the specific media file includes a multicast-support identifier, after the browse action is received,
   wherein the specific media file accessed by the access information is played using the generated multicast address on at least one renderer controlled by the controller,
   wherein the multicast-support identifier is included in protocol information of the metadata, and
   wherein the protocol information is comprised of the multicast-support identifier, the multicast address and a port number.

9. The networked apparatus as set forth in claim 8, wherein the multicast-support identifier indicates a protocol type and is specified as "rtp-udp-multicast", "internal-multicast", or "rtsp-rtp-udp-multicast".

10. The networked apparatus as set forth in claim 8, wherein the processor is further configured to generate a multicast address for multicast of each media file when a number of the specific media file is more than two.

11. The networked apparatus as set forth in claim 8, wherein the multicast address is transmitted from the controller to at least one media renderer, and whereby the at least one media renderer renders the media file multicasted from the media server.

12. The networked apparatus as set forth in claim 11, wherein upon request from another media renderer for rendering of the media file that is being multicasted by the at least one media renderer, the controller checks whether the multicast of the media file being multicasted is supported based on the metadata of the media file being multicasted, and determines whether to allow the other media renderer to join a multicast group based on the checked result.

13. The networked apparatus as set forth in claim 8, wherein the processor is further configured to receive, via the interface unit, the multicast address transmitted to the controller from the controller for multicast preparation.

14. The networked apparatus as set forth in claim 8, wherein the processor is further configured to update the metadata of the specific media file by reassigning a new multicast address in a case that the multicast address is not valid.

* * * * *